Nov. 6, 1934.                C. C. JONES                1,980,139
                BOUNDARY LAYER CONTROL FOR AIRFOILS
                  Filed Oct. 26, 1932.    4 Sheets-Sheet 2
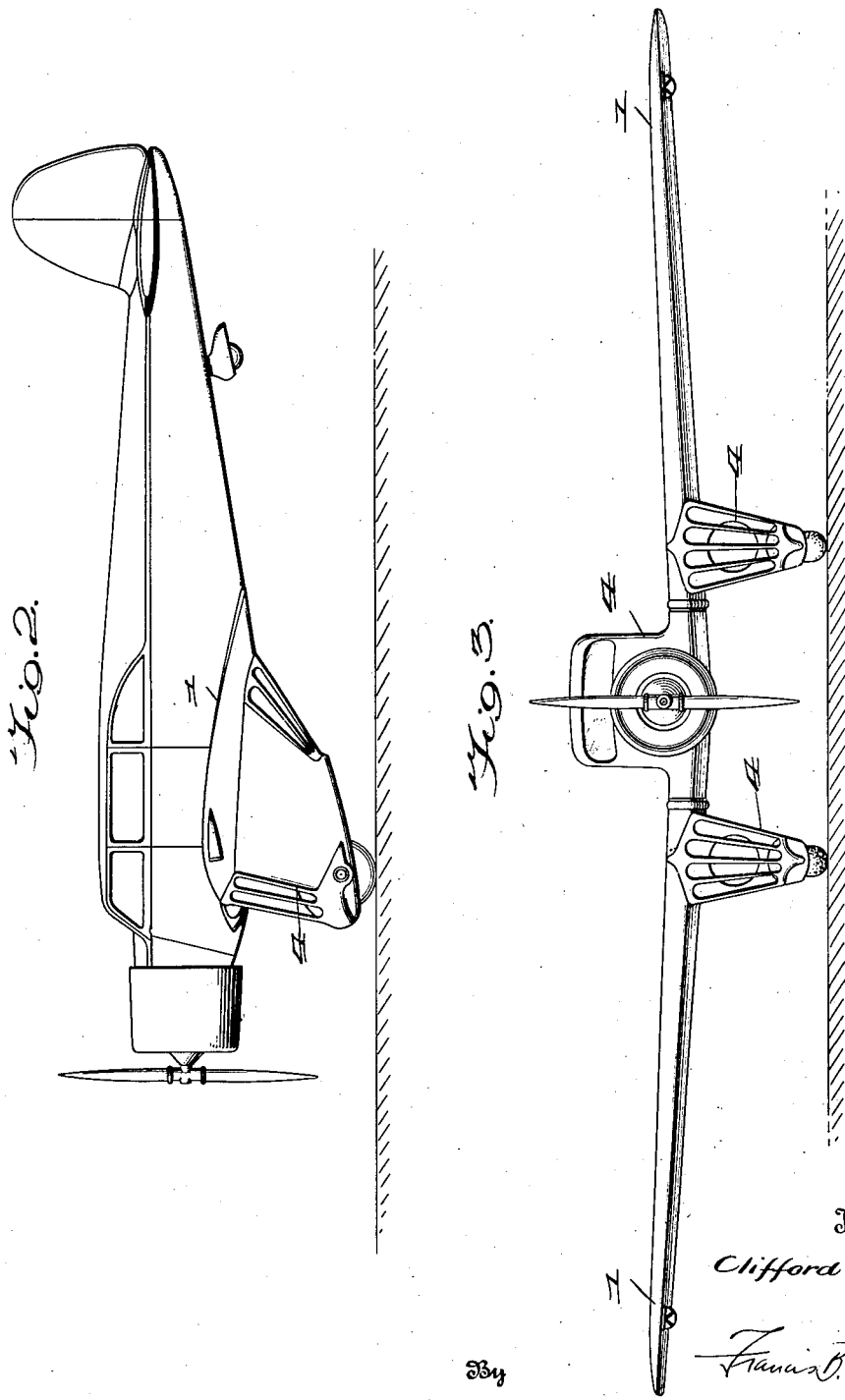
Inventor
Clifford C. Jones,
By
Francis B. Leach.
Attorney Nov. 6, 1934.  C. C. JONES  1,980,139
BOUNDARY LAYER CONTROL FOR AIRFOILS
Filed Oct. 26, 1932  4 Sheets-Sheet 3

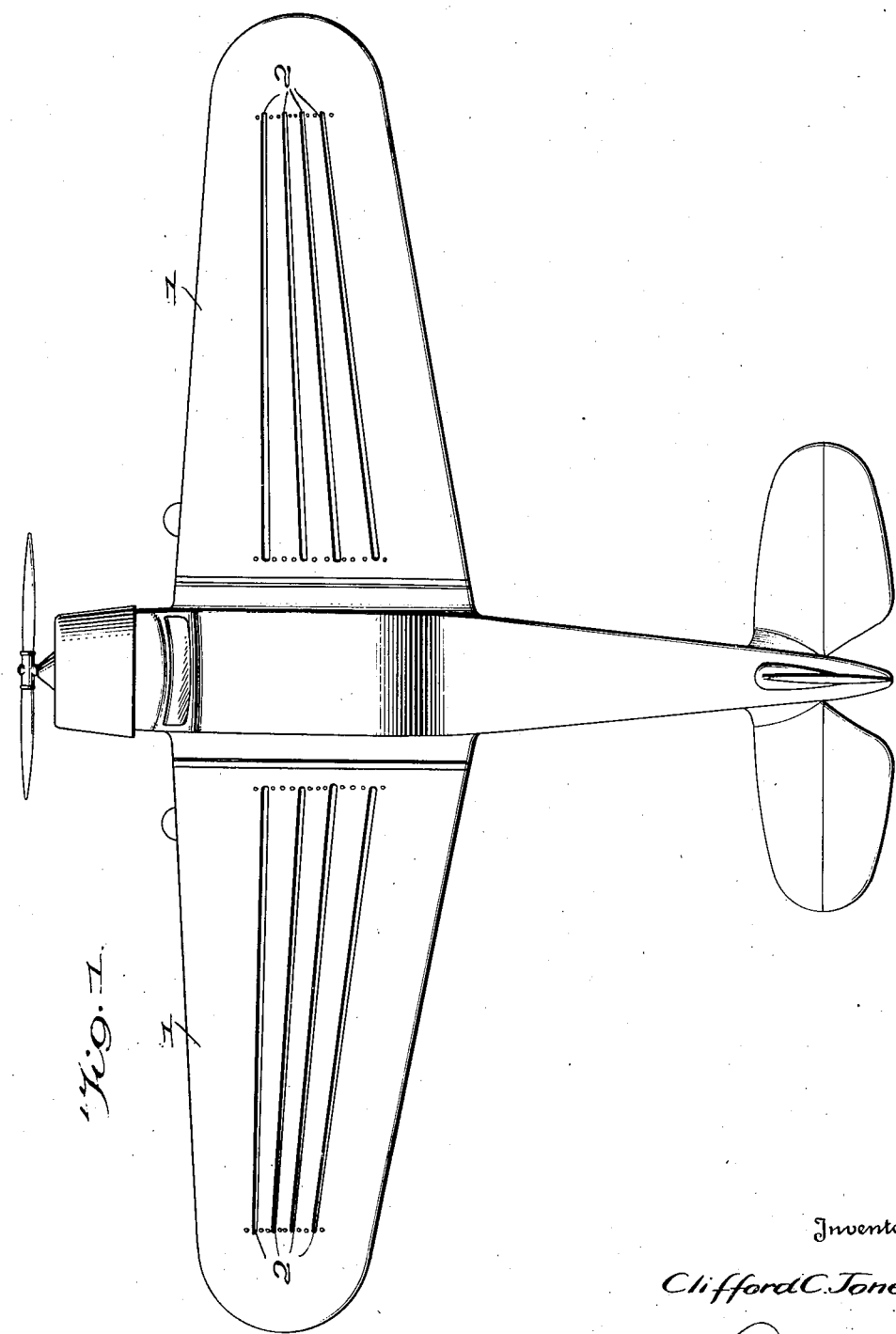

Inventor
Clifford C. Jones
By Francis B. Lee
Attorney

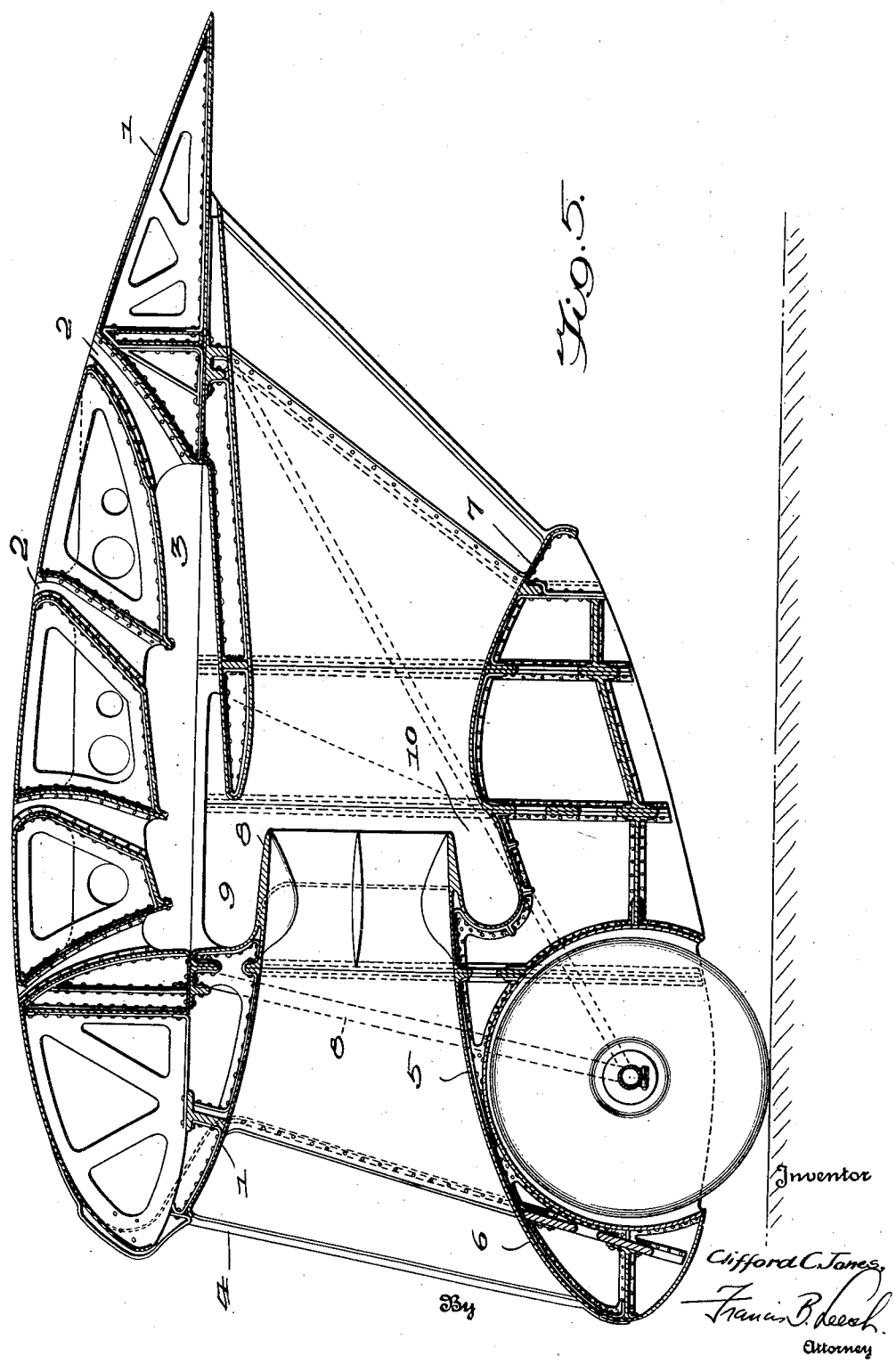

Patented Nov. 6, 1934

1,980,139

UNITED STATES PATENT OFFICE 1,980,139

BOUNDARY LAYER CONTROL FOR AIRFOILS

Clifford C. Jones, Washington, D. C.

Application October 26, 1932, Serial No. 639,715

4 Claims. (Cl. 244—12)

This invention relates broadly to a novel means of increasing the aerodynamic efficiency of aircraft by removing "boundary layer" from the airfoils of such aircraft.

It is well known by those skilled in the art that in sustaining flight of airfoils the air medium through which the airfoil is passing does not adhere closely to the contour of the upper airfoil surfaces. By this deviation of air over the airfoil, a tremendous loss of lift efficiency occurs and a large amount of stagnant air in layers accumulates above the central pressure area of the airfoil.

These layers of dead or "non-lift" air are generally known as "boundary layer" and are produced by the slowing up of the flow of air directly above the upper surface of the airfoil because of frictional effects.

More specifically, it is known that air passing over the upper surfaces of an airfoil in flight creates a partial field of vacuum and, consequently, a loss of kinetic energy by friction between the various layers of air moving at different velocities over the surface, the sluggish layer being adjacent the airfoil. Owing to this loss of kinetic energy, the pressure gradient is increased and the air layers do not come to rest on the trailing edge of the airfoil but veer off in the direction of airfoil motion. Thus a layer of air known as "boundary layer" is always present during flight due to this decrease of kinetic energy. In being moved across the upper surface of the airfoil the boundary layer builds up as the speed of flight increases and becomes a component of the drag factor. It follows that the efficiency of an airfoil could be greatly increased if the flow of air over the airfoil could be made to approximate the upper surface throughout its entire span. To carry out this theory, the present invention was made.

Many schemes have been advanced for economically and instantly removing the boundary layer, for example, blowers, turbines, etc. In my prior Patent No. 1,764,842, issue June 17, 1930, I disclosed and claimed one manner of accomplishing this removal, namely, by mounting ejectors above the fuselage and connecting suction conduits from the ejectors to a series of valves controlling transverse slots in the upper surfaces of the airfoils.

The present invention provides for the utilization of a fixed orifice induction-type venturi integrally formed in the landing gear of an airplane, and outside of the slipstream of the propeller, to create a suctional force sufficient to remove the boundary layer.

An object of the invention is to construct an airfoil having a plurality of outwardly tapering slots longitudinally positioned in the upper surfaces of the airfoils through which the layer of "non-lift" air is removed and exhausted by the venturi.

In the drawings, Fig. 1 illustrates a top plan view of an airplane constructed according to this invention and showing the longitudinal slots in the upper surface of the airfoil.

Fig. 2 is a side elevation of the airplane illustrating the undercarriage.

Fig. 3 is a front elevation illustrating the venturi in the undercarriage together with their guards.

Fig. 4 is a top plan view of one of the airfoils with the undercarriage and wing structure in section, while Fig. 5 is a vertical section through the venturi taken on line 5—5 of Fig. 4.

Figure 4:
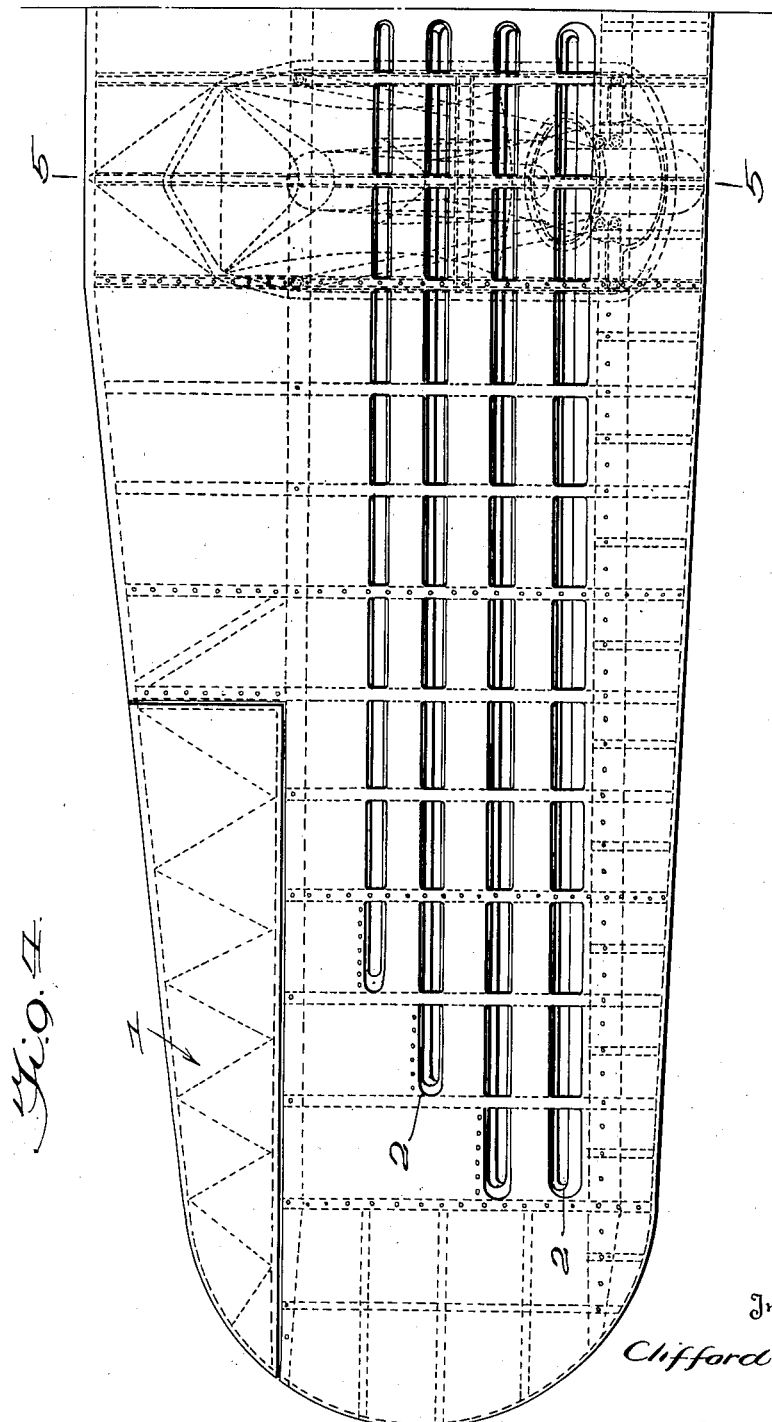

Referring to Figs. 1, 4 and 5 of the drawings, it will be seen that a plurality of longitudinal tapered slots 2 are formed in the central pressure area of the airfoils 1—1. These slots or passages 2—2 pass downwardly through the wing section and open into an integral internal conduit or header 3 which runs longitudinally under the slots 2 in the wings. The mechanical construction of this header 3, which also forms part of the structural details of the airfoil, is not essential to this application, it being disclosed in detail and claimed in a co-pending application, filed Nov. 7, 1932, Serial No. 641,680.

Suffice it to say, the headers 3 terminate in the split-leg undercarriage 4—4. As disclosed in Fig. 5, the undercarriage is made up of metal units with an air-wheel at the lower end of each leg for take-off and landing.

For illustrative purposes only, the present plane is of the low wing type, the space between the cowling surrounding the landing wheel and the airfoil being sufficient to include a large integrally constructed fixed orifice Venturi tube in each leg.

Forming an integral portion of the leg structure, wheel cowling and airfoil support, the Venturi tube 5 flares outwardly at the front section 6 to insure a proper air inlet passage and rearwardly the Venturi tube is flared outwardly to insure proper exhaust. Intermediate the inlet and outlet at 10, the Venturi tube is split and a fixed orifice 8 is affixed to the small end of the inlet section 6. This fixed orifice lies centered within the circular surrounding enlarged discharge section 9 of the header 3.

Consequently, if air is passing through the inlet 6 of the Venturi tube, a suction of considerable magnitude is formed at the orifice 8 and throat 10. Any air in discharge opening 9 is sucked out and forced rearwardly through flared section 7 to the atmosphere at the rear of the plane and is dissipated before reaching the tail group.

This exhaustion takes place whenever the airplane is moving forward as the inlets 6 to the venturis in the split-legs of the undercarriage are subjected to air pressure created by the forward speed. It follows that the suction created at 9 draws large volumes of air from conduit or header 3 which receives its air supply through slots 2 in the upper surfaces of the airfoils.

Inasmuch as the very detrimental boundary layer increases in mass as the speed of the airfoil increases, and as the air rushing through the venturis increases in proportion to this same speed, the faster the forward movement of the airfoil, the greater the suction created in the venturis and the greater amount of boundary layer removed from the top surfaces of the airfoils through the tapered slots and discharged from the rear of the venturis.

The salient feature of this invention lies in the vast increase of lift efficiency of the airfoil, particularly at high angles of attack. Thus an airplane constructed in accordance herewith has tremendously greater lifting value per square foot of airfoil surface than conventional types, and such a plane can take off and land at relatively low speeds.

What I claim is:

1. In an airplane, an airfoil, slots formed in the upper surfaces of said airfoil, a venturi forming an integral portion of the undercarriage of the airplane and a conduit leading from the said slots to the said venturi.

2. In an airplane, an airfoil provided with a plurality of longitudinal slots in the upper surfaces thereof, the slots communicating with a longitudinal passage encompassed within the airfoil, and a venturi integrally formed in the undercarriage of the airplane at one end of the passage.

3. In an airplane, a fuselage, an airfoil attached thereto, open areas provided in the upper surfaces of the airfoil, a split undercarriage supporting the airfoil and terminating in landing wheels, and a venturi integrally formed in each undercarriage with the constricted throat thereof in circulatory communication with the open areas in the airfoil.

4. An airplane including a fuselage, an airfoil attached thereto, a split-leg undercarriage depending therefrom, landing wheels supported on the legs of the undercarriage, the said airfoil having openings in its upper surface communicating with an air exhaust passage adjacent the inner bottom surface of the airfoil and a fixed throat venturi integrally formed in the split legs of the undercarriage and opening into the said air exhaust passage.

CLIFFORD C. JONES.